(12) United States Patent
Morimoto et al.

(10) Patent No.: US 7,748,051 B2
(45) Date of Patent: *Jun. 29, 2010

(54) CONTENTS SERVER, CONTENTS RECEIVING APPARATUS AND NETWORK SYSTEM FOR ADDING INFORMATION TO DIGITAL CONTENTS

(75) Inventors: Norishige Morimoto, Setagaya-ku (JP); Kohichi Kamijoh, Kanagawa-ken (JP); Seiji Kobayashi, Kanagawa-ken (JP); Masato Kurokawa, Tokyo-to (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/194,468

(22) Filed: Aug. 19, 2008

(65) Prior Publication Data

US 2009/0019287 A1 Jan. 15, 2009

Related U.S. Application Data

(63) Continuation of application No. 10/635,952, filed on Aug. 7, 2003, now Pat. No. 7,469,422.

(30) Foreign Application Priority Data

Aug. 14, 2002 (JP) ............................. 2002-236644

(51) Int. Cl.
G06K 9/00 (2006.01)
(52) U.S. Cl. ............................. 726/32; 726/26; 713/176
(58) Field of Classification Search ............... 726/32
See application file for complete search history.

(56) References Cited

U.S. PATENT DOCUMENTS

| 5,905,800 | A | 5/1999 | Moskowitz et al. |
|---|---|---|---|
| 5,930,369 | A | 7/1999 | Cox et al. |
| 6,330,672 | B1 | 12/2001 | Shur |
| 6,373,960 | B1 | 4/2002 | Conover et al. |
| 6,522,766 | B1 | 2/2003 | Ratnakar |
| 6,654,887 | B2 | 11/2003 | Rhoads |
| 6,768,807 | B1 | 7/2004 | Muratani |
| 6,804,779 | B1 | 10/2004 | Carroni et al. |
| 6,807,285 | B1 | 10/2004 | Iwamura |
| 6,901,515 | B1 | 5/2005 | Muratani |
| 6,944,298 | B1 | 9/2005 | Rhoads |
| 6,954,857 | B2 | 10/2005 | Pelly et al. |
| 6,999,598 | B2 | 2/2006 | Foote et al. |
| 7,007,166 | B1 | 2/2006 | Moskowitz et al. |
| 7,085,396 | B2 | 8/2006 | Pelly et al. |
| 7,130,443 | B1 | 10/2006 | Werner et al. |
| 7,398,395 | B2 | 7/2008 | Epstein |
| 2002/0006203 | A1 | 1/2002 | Tachibana et al. |
| 2003/0009669 | A1 | 1/2003 | White et al. |
| 2003/0065747 | A1 | 4/2003 | Sakamoto et al. |
| 2004/0143742 | A1 | 7/2004 | Muratani |
| 2005/0033965 | A1 | 2/2005 | Iwamura |
| 2006/0020806 | A1 | 1/2006 | Yamashita et al. |

*Primary Examiner*—Emmanuel L Moise
*Assistant Examiner*—David J Pearson
(74) *Attorney, Agent, or Firm*—Shimokaji & Associates, P.C.

(57) ABSTRACT

Method and system for embedding a unique and different digital watermark in digital contents for each access without increasing the overhear or load at the contents server. The contents server has a digital watermark-embedded contents storage unit for storing a plurality of digital contents where a different digital watermark is embedded, and a fingerprint performing unit for, adding to the digital contents the information specified using a bit row that is formed by a digital watermark being embedded for each part of the digital contents.

13 Claims, 11 Drawing Sheets

CONTENTS SERVER, CONTENTS RECEIVING APPARATUS AND NETWORK SYSTEM FOR ADDING INFORMATION TO DIGITAL CONTENTS

FIELD OF THE INVENTION

The present invention relates to a method for distributing the digital contents, and more particularly to a method for adding predetermined information to the digital contents along with the distribution of the digital contents.

BACKGROUND

In distributing the video or sound as digital data (digital contents), it is common practice to embed the electronic watermark information (digital watermark) in the digital contents in order to designate a source of the digital contents or enhance the security.

Nowadays, various kinds of digital contents are distributed on-line via a network such as the Internet, in which there is a demand for an application for adding the information (identification information) different for each distribution destination or user in distributing the digital contents, as prevention means for preventing illegal use of the distributed digital contents, and means for designating a secondary distribution destination (this application is hereinafter referred to as a fingerprint). To implement this fingerprint, the additional information may be described in a format header of the digital contents. However, considering that the distributed digital contents are possibly subjected to various edits including compression, DA/AD conversion, and format conversion, it is effective to embed the additional information to the digital contents themselves, employing a digital watermark technique.

As above described, one problem is that in the fingerprint, it is required to change the information added to the digital contents for each user to access or each distribution destination. However, a process of embedding the digital watermark to the digital contents comprises calculating an operation amount in a range without influence on the quality of digital contents themselves (without deterioration in the visual or aural elements), whereby the processing calculation cost is generally very high. Therefore, if a different digital watermark is embedded for each access to the digital contents, a server providing the digital contents (hereinafter referred to as a contents server) has a very high load.

In a digital contents distributing system practically on-line, it is required for a plurality of users to gain access simultaneously and acquire desired digital contents. However, in the above system where the contents server has high load, the number of users capable of gaining access simultaneously can not be increased to lack the practicality of the system.

In the case where the digital contents are distributed in the recent network system, the digital contents of distribution object are usually non-reversibly compressed due to a limited bandwidth in the network environment. Therefore, it is required to perform a process of unpacking and recompressing the digital contents to embed a digital watermark, so that the contents server has more load.

Particularly, in a streaming distribution in which the contents distribution in real time needs to be guaranteed for each user, it is a significant problem that the contents server has an increased load.

SUMMARY OF THE INVENTION

Thus, it is an object of the present invention to embed a different digital watermark in the digital contents for each access without increasing load at the contents server to the utmost.

Also, it is another object of the invention to implement a digital contents distribution system practically on line, employing such a digital watermark-embedding technique.

In order to accomplish the above object, the present invention is implemented as a network system configured in the following way. This network system comprises a contents server distributing digital contents via a network, and a client terminal receiving the distributed digital contents. And this client terminal transmits an acquisition request for desired digital contents to the contents server, and the contents server switches and synthesizes the plurality of digital contents where a different digital watermark is embedded for each specific part to generate the digital contents with predetermined information embedded in response to this acquisition request and transmits the generated digital contents to the client terminal.

Preferably, this contents server comprises a contents storage part for storing a plurality of digital contents where a different digital watermark is embedded, and an information adding part for, by reading out a plurality of the digital contents from the contents storage part, switching and synthesizing the digital contents for each specific part, adding to the digital contents information specified by a digital watermark being embedded for each part of the digital contents.

Also, another network system of the invention comprises a server distributing digital contents, and a client terminal receiving the distributed digital contents. This server distributes a plurality of digital contents wherein a different digital watermark is embedded at the same time. On the other hand, this client terminal switches and synthesizes the plurality of received digital contents for each specific part to add predetermined information to the digital contents.

This network system is implemented as a broadcasting network such as television broadcasting. In this case, the server is a broadcasting station and the client terminal is a receiving apparatus such as a television receiver.

Preferably, this client terminal comprises a receiving means for receiving a plurality of digital contents wherein a different digital watermark is embedded, and an information adding means for, by switching and synthesizing the plurality of digital contents received by this receiving means for each specific part, adding to the digital contents information specified by a digital watermark being embedded for each part of the digital contents.

Moreover, the invention is implemented as a computer configured in the following way. That is, this computer comprises a selector for inputting a plurality of digital contents wherein a different digital watermark is embedded, and for outputting while switching selectively the plurality of digital contents for each specific part, and a control part for controlling the selector based on a predetermined embedment information, the computer generating by a control at the control part, digital contents wherein the embedment information is described with a bit row being formed by the digital watermark-embedded in for each of the part of the digital contents.

Another invention to accomplish the above object is implemented as a method for adding information to digital contents by using a computer. That is, this information adding method comprises a first step of generating a plurality of digital watermark-embedded contents by embedding a different digital watermark in predetermined digital contents, and a second step of, by switching and synthesizing the plurality of digital contents where a different digital watermark is embedded for each specific part, adding to the digital contents information specified by a digital watermark being embedded for each part of the digital contents.

In this method for adding information to digital contents, the first step comprises compressing the generated digital contents, and creating the pointer information pointing to a delimiter position in the part of the compressed digital contents, and the second step comprises synthesizing the digital contents based on the pointer information, and adding the information to the digital contents without unpacking the digital contents.

Further, the invention is implemented as a program for performing the data processing by controlling a computer. This program comprises a first process for reading out predetermined embedment information from a predetermined storage device, and a second process for acquiring a plurality of digital contents where a different digital watermark is embedded, selectively switching the plurality of digital contents for a specific part, based on the embedment information, and generating the digital contents describing the embedment information, using a bit sequence formed with a digital watermark-embedded in each specific part of the digital contents. Such program is provided in a magnetic disk, an optical disk, a semiconductor memory, or other recording medium, or distributed via a network.

THE FIGURES

Various aspects of the invention are illustrated in the Figures appended hereto.

Figure 1:
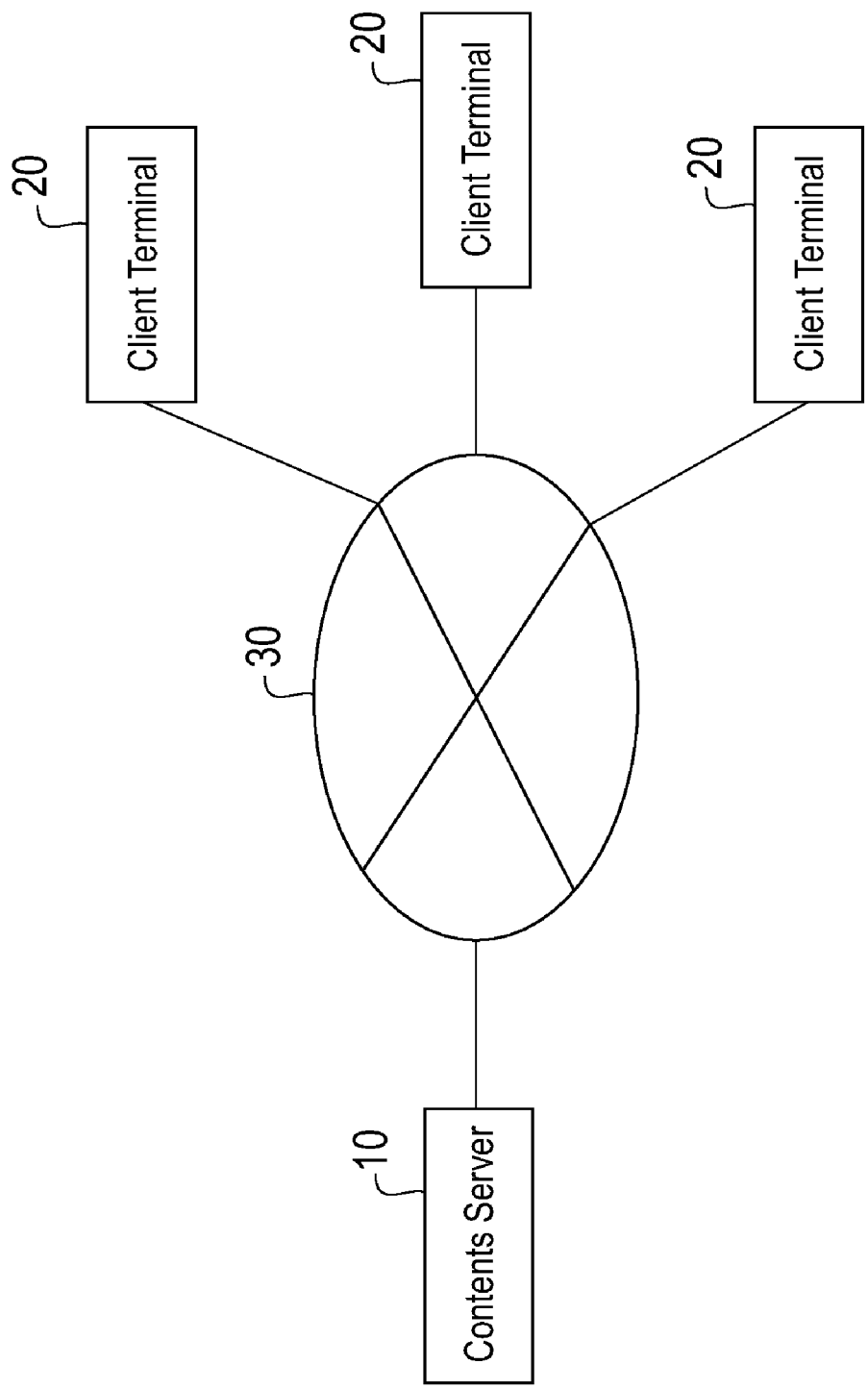
FIG. 1 is a diagram schematically showing the overall configuration of a digital contents distributing system according to a first embodiment of the present invention.

As shown in the Figures, element 10 is the Contents server, element 11 is the Original contents storage part, element 12 is the digital watermark-embedding part, element 13 is the Digital watermark-embedded contents storage part, element 14 is the Fingerprint performing part, element 20 is the Client terminal, element 30 is the Network, element 40 is the Broadcast station, element 50 is the Receiving apparatus, element 51 is the Receiving component, element 52 is the Contents using part, element 101 is the CPU, element 102 is the M/B chip set, element 103 is the Main memory, element 105 is the Hard disk, element 106 is the Network interface, element 141 is the Contents selector, and 142 is the Pseudo random number generator.

DETAILED DESCRIPTION

The first and second embodiments of the present invention will be described below in detail with reference to the accompanying drawings.

First Embodiment

FIG. 1 is a diagram schematically showing the overall configuration of a digital contents distributing system according to a first embodiment of the present invention.

As shown in FIG. 1, the system of this embodiment comprises a contents server 10 that possesses and distributes the digital contents (hereinafter simply referred to as contents) such as video or sound via a network 30 and a client terminal 20 that receives the contents distributed from the contents server 10.

In this embodiment, the contents server 10 makes a fingerprint with digital watermark in the contents in distributing the contents. That is, the contents server adds the information different for each distribution destination or user (identification information) to the contents, using the digital watermark.

The client terminal 20 receives the contents distributed from the contents server 10. The user at the client terminal 20 operates the client terminal 20 to employ (reproduce or peruse) the acquired contents. The fingerprint made in the contents has no influence (deterioration of image quality or sound) on the use of the contents, because the information is added using a digital watermark technique.

The network 30 is any one of the networks usable for distributing the contents, such as information communication networks such as the Internet and various kinds of WAN (Wide Area Network) or LAN (Local Area Network), and the broadcasting networks such as for television broadcasting. The network line may be wire or wireless.

Figure 2:
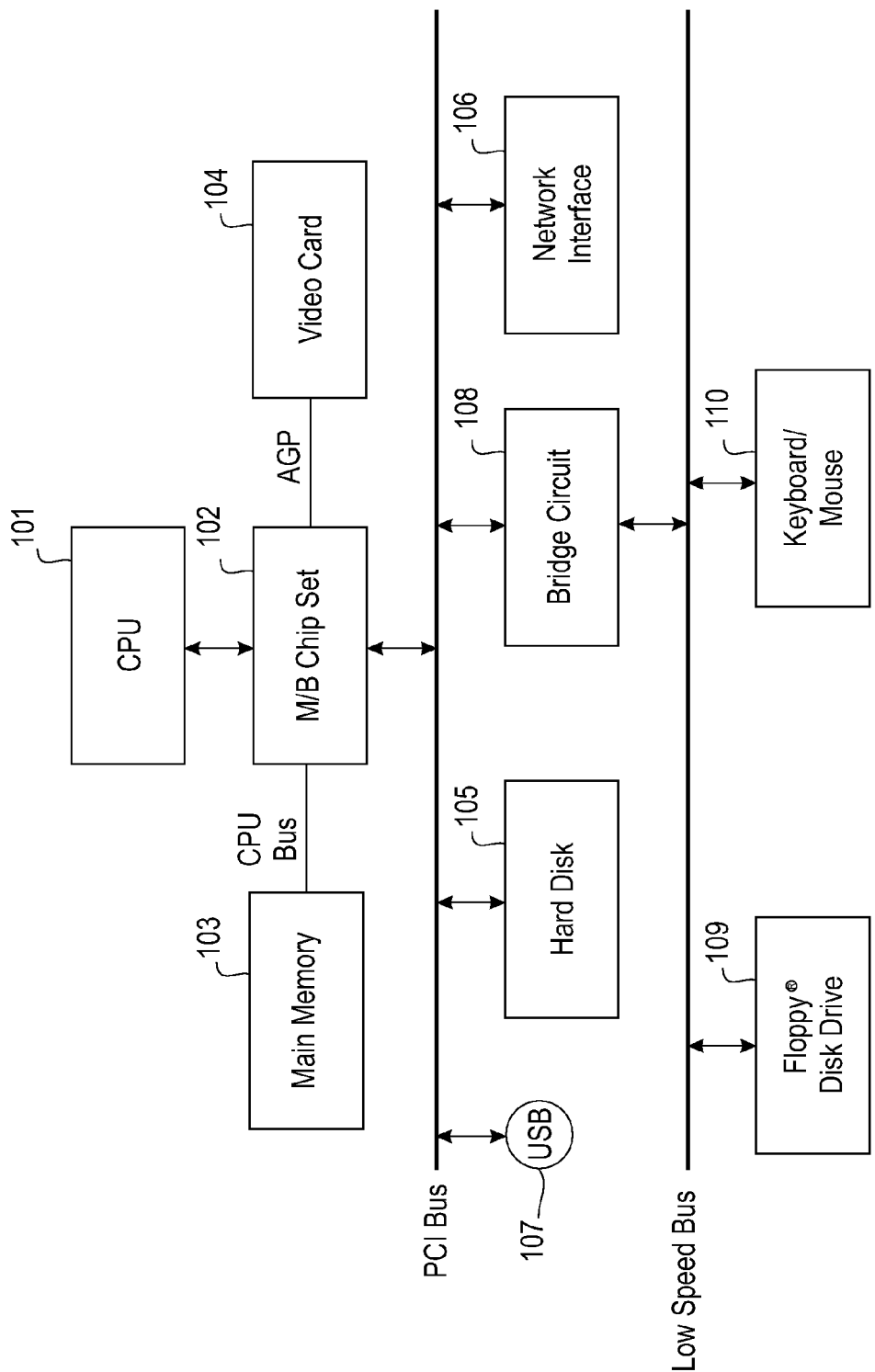
FIG. 2 is a block diagram typically showing a hardware configuration of a computer suitable for implementing a contents server according to the first embodiment of the invention.

FIG. 2 is a block diagram typically showing a hardware configuration of a computer suitable for implementing the contents server 10 in this embodiment of the invention.

The computer in FIG. 2 comprises a CPU (Central Processing Unit) that is an operation means, a main memory 103 connected to the CPU 101 via an M/B (mother board) chip set 102 and a CPU bus, a video card 104 connected to the CPU 101 via the M/B chip set 102 and an AGP (Accelerated Graphics Port), a hard disk 105, a network interface 106 and a USB port 107 connected to the M/B chip set 102 via a PCI (Peripheral Component Interconnect) bus, and a floppy disk drive 109 and a keyboard/mouse 110 connected via the PCI bus, a bridge circuit 108 and a low speed bus such as an ISA (Industry Standard Architecture) bus to the M/B chip set 102.

FIG. 2 only exemplifies the hardware configuration of the computer that implements this embodiment, but various other configurations may be taken as far as this embodiment is applicable. For example, a video memory may be only mounted, instead of providing the video card 104, to process the image data in the CPU 101. A CD-ROM (Compact Disc Read Only Memory) or DVD-ROM (Digital Versatile Disc Read Only Memory) drive may be provided via an interface such as ATA (AT Attachment).

The client terminal 20 may be configured by the computer as shown in FIG. 2, like the contents server 10. Also, it may be realized by a PDA (Personal Digital Assistant), a portable telephone, or other information terminal units having the network function.

Figure 3:
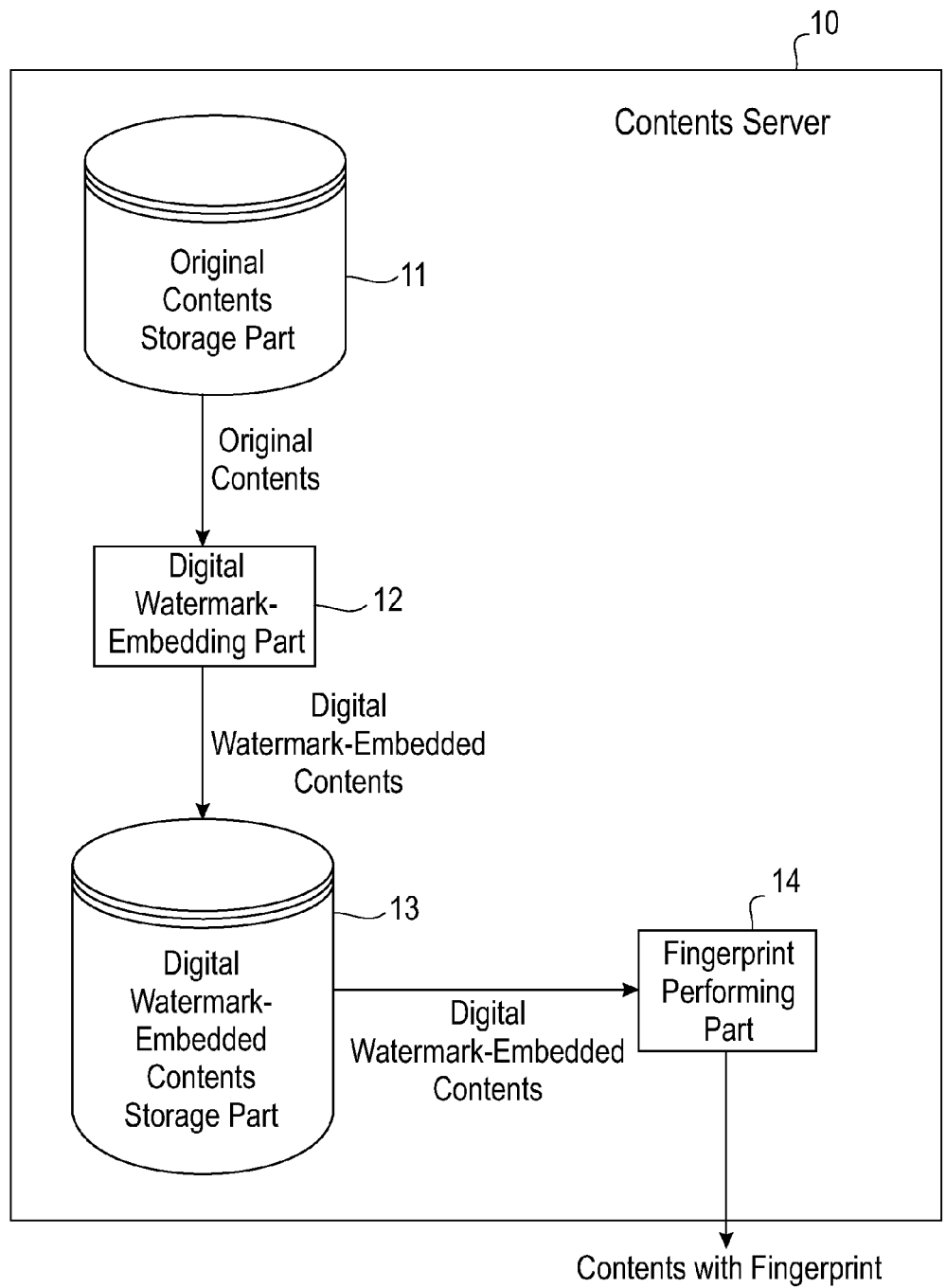
FIG. 3 is a diagram showing the functional configuration of the contents server according to the first embodiment of the invention.

FIG. 3 is a diagram showing the functional configuration of the contents server 10.

As shown in FIG. 3, the contents server 10 comprises an original contents storage part 11 for storing the original contents, a digital watermark-embedding part 12 for embedding a digital watermark in the original contents, a digital watermark-embedded contents storage part 13 for storing the contents with the digital watermark-embedded, and a fingerprint performing part 14 for making a fingerprint (adding fingerprint information) employing the contents with the digital watermark-embedded.

In the configuration as shown in FIG. 3, the digital watermark-embedding part 12 and the fingerprint performing part 14 are virtual software blocks that are implemented by the CPU 101 under program control. Also, the original contents storage part 11 and the digital watermark-embedded contents storage part 13 are implemented by a storage device such as the main memory 103 or the hard disk 105.

In FIG. 3, the characteristic configuration in this embodiment is only shown. In practice, the contents server has the general server functions such as accepting an access request from the client terminal 20.

The original contents storage part 11 stores the original data of the contents distributed from the contents server 10, and the digital watermark-embedding part 12 reads out predetermined contents from the original contents storage part 11, embeds a digital watermark in the contents, and stores the contents in the digital watermark-embedded contents storage part 13.

The digital watermark-embedding part 12 embeds plural kinds of digital watermark in one kind of contents to generate a plurality of digital watermark-embedded contents. The plurality of generated digital watermark-embedded contents represent the bit information 0 for one part and the bit information 1 for the other part.

Also, an operation of embedding digital watermark in the contents is performed beforehand, irrespective of the process for distributing the contents.

The fingerprint performing part 14 reads out the digital watermark-embedded contents meaning the bit information 0 and the digital watermark-embedded contents meaning the bit information 1 from the digital watermark-embedded contents storage part 13, and switches and synthesizes these two kinds of contents for each specific part (partial set). Thereby, a bit row is formed by the digital watermark-embedded in the contents and the information in the fingerprint (fingerprint information) is described by this bit row.

This embodiment deals with a digital watermark-embedment detecting method based on a frequency diffusion technique typically employed as the digital watermark technique. With this method, a signal sequence b(n) representing the bit information is modulated by a pseudo random number sequence p(n), and convoluted with a partial set C(n) of a contents original signal (original contents) C to embed any bit information. The partial set C(n) of the contents original signal C is a data set of contents divided in accordance with an appropriate rule. Each data is a part of original contents, and the whole of the original contents is constituted by an entire set.

$$Ce(n)=C(n)+\alpha\times[2b(n)-1]\times p(n)$$

where b(n)=[0,1]
C(n)∈C, C(i)^C(j)=f(i'j)

Herein, Ce(n) is a partial set of the contents Ce with the fingerprint made (i.e., for distribution), a is a parameter representing the intensity of digital watermark, and n is an index representing a part of the contents necessary to embed the 1 bit information.

In detecting the digital watermark-embedded by this method, the following calculation is performed $$R(n) = Ce(n) \times p(n)$$
$$= C(n) \times p(n) + \alpha \times$$
$$[2b(n) - 1] \times p(n)^2 \rightleftharpoons a \times [2b(n) - 1] \times (n)^2$$

Thereby, the embedded bit information b(n) is detected by comparing an obtained value with a certain threshold.

Also, in making the fingerprint in the contents with this method, 2b(n)−1 takes the values of ±1, because the signal sequence b(n) is the bit information. Accordingly, the digital watermark-embedding part 12 generates the contents Ce0 and Ce1 where digital watermark is embedded in both cases of b(n)=0 and b(n)=1.

$$Ce0(n)=C(n)-\alpha p(n)(Ce0(n)\in Ce0)$$

$$Ce1(n)=C(n)+\alpha p(n)(Ce1(n)\in Ce1)$$

That is, the contents Ce0(n) means the bit information 0, and the contents Ce1(n) means the bit information 1.

When the fingerprint is made on a contents original signal C, employing the contents Ce0 and Ce1 with digital watermark-embedded, the fingerprint performing part 14 switches the contents Ce0(n) and Ce1(n) in accordance with the information m(n) to be embedded as the fingerprint information (hereinafter referred to as embedment information m(n)) for each partial set C(n). Thereby, the contents Cf where embedment information m(n) described using the bit information as the fingerprint information is embedded is generated. The embedment information m(n) may be arbitrarily set up, depending on the distribution destination or time of the contents, and stored in a predetermined storage device (main memory 103 in the computer as shown in FIG. 2).

$$Cf(n)=(m(n)=0)?Ce0(n):Ce1(n)(Cf(n)\in Cf)$$

Where Cf(n) is a partial set of Cf.

Figure 4:
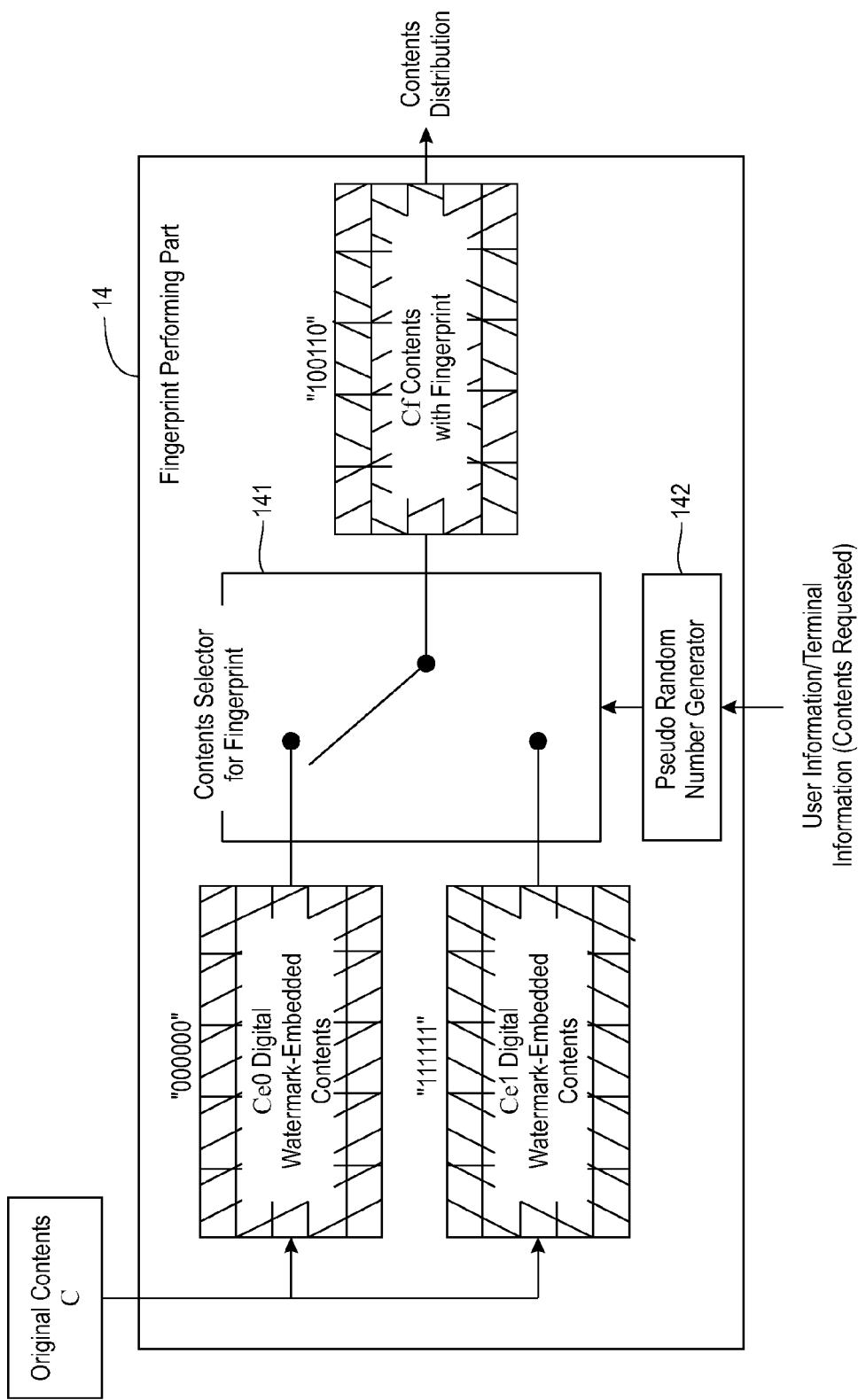
FIG. 4 is a diagram for explaining a method for generating the fingerprint information in a fingerprint performing part according to the first embodiment of the invention.

FIG. 4 is a diagram for explaining a method for generating the fingerprint information in the fingerprint performing part 14.

As shown in FIG. 4, the fingerprint performing part 14 comprises a contents selector 141 for inputting the digital watermark-embedded contents Ce0 and Ce1, and selectively switches and outputs the digital contents, and a pseudo random number generator 142 as control means of the contents selector 141.

The contents selector 141 inputs the digital watermark-embedded contents Ce0 meaning the bit information 0 and the digital watermark-embedded contents Ce1 meaning the bit information 1. And it selectively switches and outputs a partial set Ce0(n) of the contents Ce0 and a partial set Ce1(n) of the contents Ce1 in accordance with a pseudo random number sequence generated by the pseudo random number generator 142 to generate the contents Cf with fingerprint made.

The pseudo random number generator 142 calculates a seed of pseudo random number on the basis of the access information including the terminal information (terminal ID) of the client terminal 20 having issued an acquisition request for the contents and the information regarding the user of the client terminal 20 (user ID), calculates a pseudo random number function employing the obtained seed, and generates a pseudo random number sequence for controlling the contents selector 141.

In this manner, the contents selector 141 is controlled employing the pseudo random number sequence generated by the pseudo random number generator 142, so that the bit information is formed with digital watermark-embedded for each partial set Cf(n) of the contents Cf with fingerprint. Employing this bit information, the fingerprint information corresponding to the embedment information m(n) is described in the contents Cf.

Figure 5:
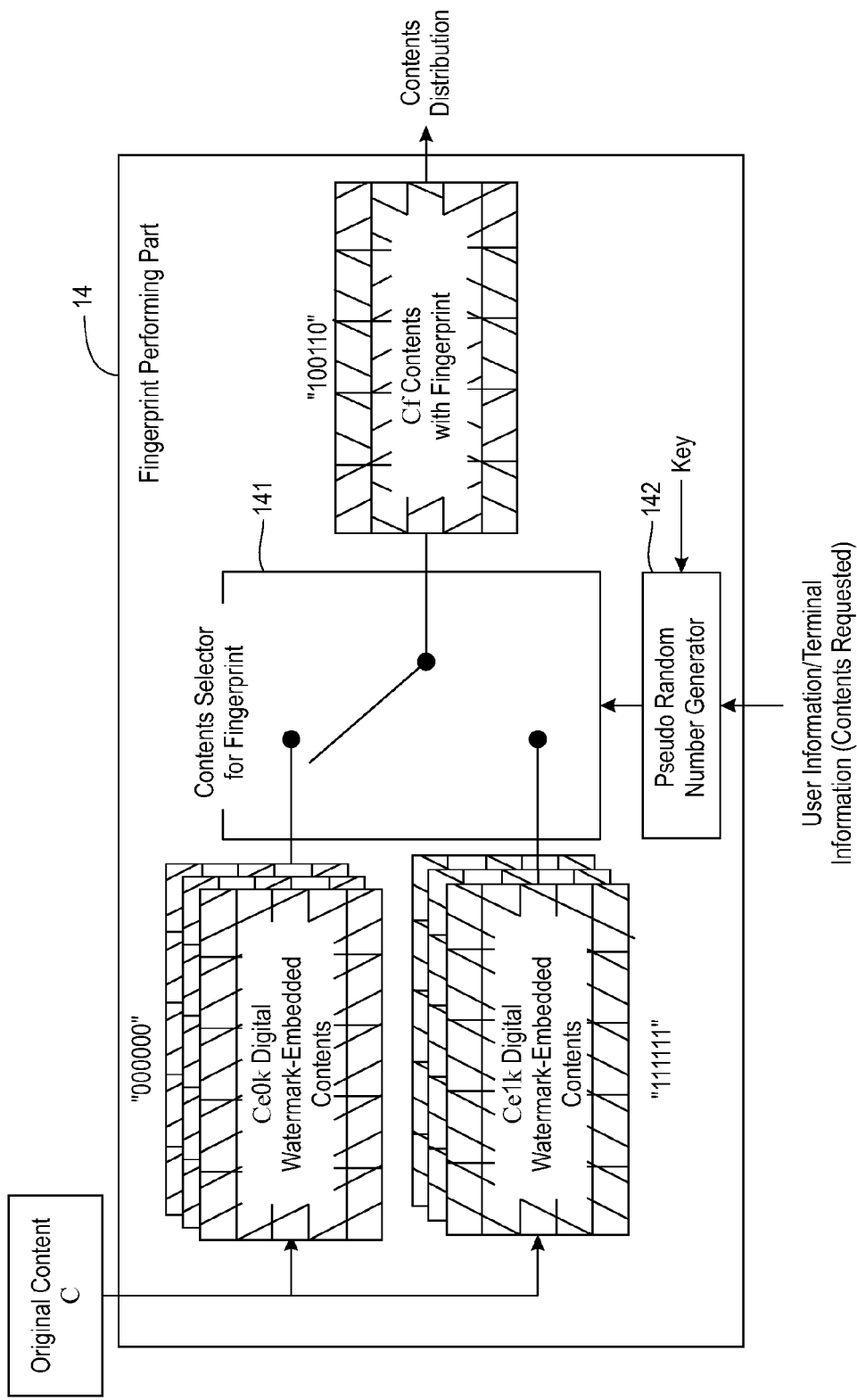
FIG. 5 is a diagram for explaining another method for generating the fingerprint information in the fingerprint performing part.

FIG. 5 is a diagram for explaining another method for generating the fingerprint information in the fingerprint performing part 14.

In this example, the contents where a digital watermark corresponding to the bit information 0 is embedded and the contents where a digital watermark corresponding to the bit information 1 is embedded are prepared each in plural number. A pseudo random number sequence p(n) for describing the bit information is generated employing the predetermined access information and a certain key. Also, the generated pseudo random number sequence p(n) is changed by changing the value of this key in accordance with a certain rule.

That is, the digital watermark-embedding part 12 generates the digital watermark-embedded contents Ce0k and the digital watermark-embedded contents Ce1k in plural number at least corresponding to the variable kinds of pseudo random number sequence p(n), which are employed to describe the fingerprint information.

$$Ce0k(n)=C(n)-\alpha(n,k)(Ce0k(n) \epsilon e0k)$$

$$Ce1k(n)=C(n)+\alpha(n,k)(Ce1k(n) \epsilon e1k)$$

where k is an index of the key (i.e., seed of pseudo random number). Assuming that the total number of k is K, the digital watermark-embedded contents Ce0k and the digital watermark-embedded contents Ce1k are generated each at least in K ways.

Referring to FIG. 5, the contents selector 141 inputs the digital watermark-embedded contents Ce0k and the digital watermark-embedded contents Ce1k each in K ways, and selectively switches and outputs a partial set Ce0k(n) of the contents Ce0k and a partial set Ce1k(n) of the contents Ce1k in accordance with a pseudo random number sequence generated by the pseudo random number generator 142 to generate the contents Cf with fingerprint.

$$CF(n)=(m(n)=0)?Ce0k(n):Ce1k(n)(Cf(n) \epsilon Cf)$$

where A=X?Y:Z is a description method in the programming language such as C language, meaning that A=Y if X is true, or A=Z if not.

The pseudo random number generator 142 calculates the seed of pseudo random number in a maximum of K ways, based on the access information and the key, and calculates a pseudo random number function employing the obtained seed to generate a pseudo random number sequence for controlling the contents selector 141.

That is, in this example, though the digital watermark-embedded contents Ce0k representing the bit information 0 and the digital watermark-embedded contents Ce1k representing the bit information 1 are generated each in plural number, the contents where a digital watermark corresponding to the bit information (i.e., 0 or 1) suitable for describing the embedment information m(n) is embedded is selected, whereby the desired embedment information m(n) is embedded as the fingerprint information in the contents Ce. In this case, the digital watermark pattern embedded for each partial set Cf(n) in the contents Cf is very diversified, although the fingerprint information described by a bit row being formed by the digital watermark is the same. Accordingly, it is possible to enhance the security against the attacks from the contents distribution destination standing in to decode the fingerprint information by changing p(n) employing the key for each access.

Figure 6:
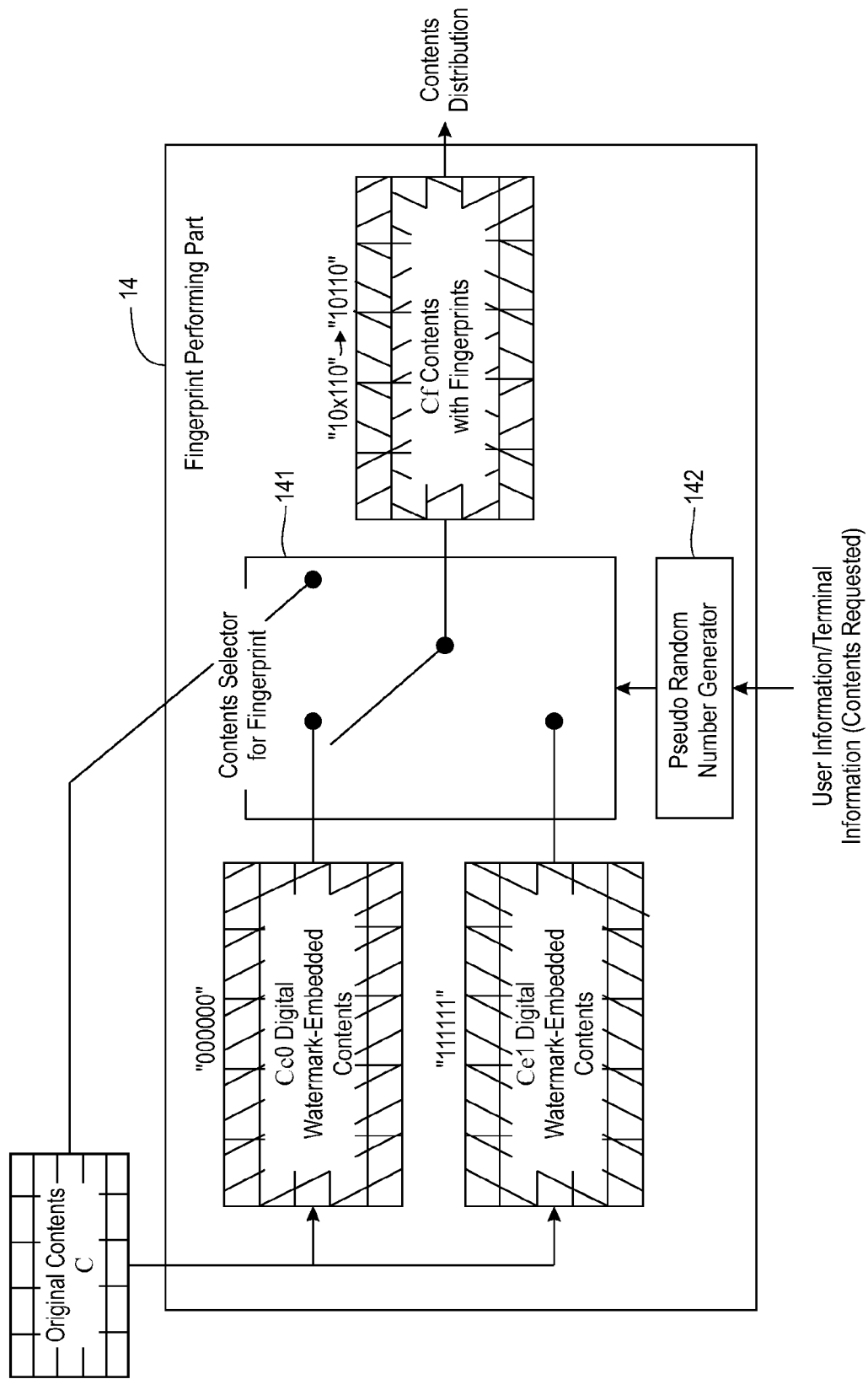
FIG. 6 is a diagram for explaining a further method for generating the fingerprint information in the fingerprint performing part.

FIG. 6 is a diagram for explaining a further method for generating the fingerprint information in the fingerprint performing part 14.

In this example, the fingerprint information is generated, employing the original contents C, in addition to the digital watermark-embedded contents Ce0 and the digital watermark-embedded contents Ce1. That is, a partial set where no bit information is partially embedded is generated in the contents Cf. The partial set where no bit information is embedded is varied for each access. It is supposed that the number s (<N) of partial sets where no bit information is partially embedded is known. Herein, N is the total number of partial sets C(n) constituting the original contents C. For example, in a case where the five digit bit information "10110" is embedded in the contents Cf with s=1, the fingerprint information is generated such as "10x110" and "1011x0", if the partial set where no bit information is embedded is represented by x.

The bit information is interpreted by discarding s smaller detected values from the detected values R(n) detected from all the partial sets Cf0) to Cf(N−1) (thereby removing the partial sets without containing bit information (parts described as x in the above example)), and employing N-s detected values.

In FIG. 6, the contents selector 141 inputs the digital watermark-embedded contents Ce0, the digital watermark-embedded contents Ce1 and the original contents C, and selectively switches and outputs a partial set Ce0(n) of the contents Ce0, a partial set Ce1(n) of the contents Ce1 and a partial set C(n) of the contents C in accordance with a pseudo random number sequence generated by the pseudo random number generator 142 to generate the contents Cf with fingerprint.

$$Cf(n)=(x(n)=1)?C(n):(m(n)=0)?Ce0(n):Ce1(n)$$

$$(Cf(n) \epsilon Cf)$$

Where x(n) is a function of returning 1 in n if the original contents are used, or 0 if not.

The pseudo random number generator 142 calculates the seed of pseudo random number, based on the access information, and calculates a pseudo random number function employing the obtained seed to generate a pseudo random number sequence for controlling the contents selector 141 in the same manner as in FIG. 4.

In this manner, it is possible to enhance the security against the attacks from the contents distribution destination standing in to decode the fingerprint information by adequately providing a part without containing bit information in the contents, and changing the position of the part without containing bit information. As a method for embedding the bit information, the fingerprint information may be generated employing a plurality of digital watermark-embedded contents Ce0k and Ce1k prepared and the original contents C, as shown in FIG. 5.

Referring to the flowcharts of FIGS. 7 and 8, a processing flow of the contents server 10 in this embodiment will be described below.

Figure 7:
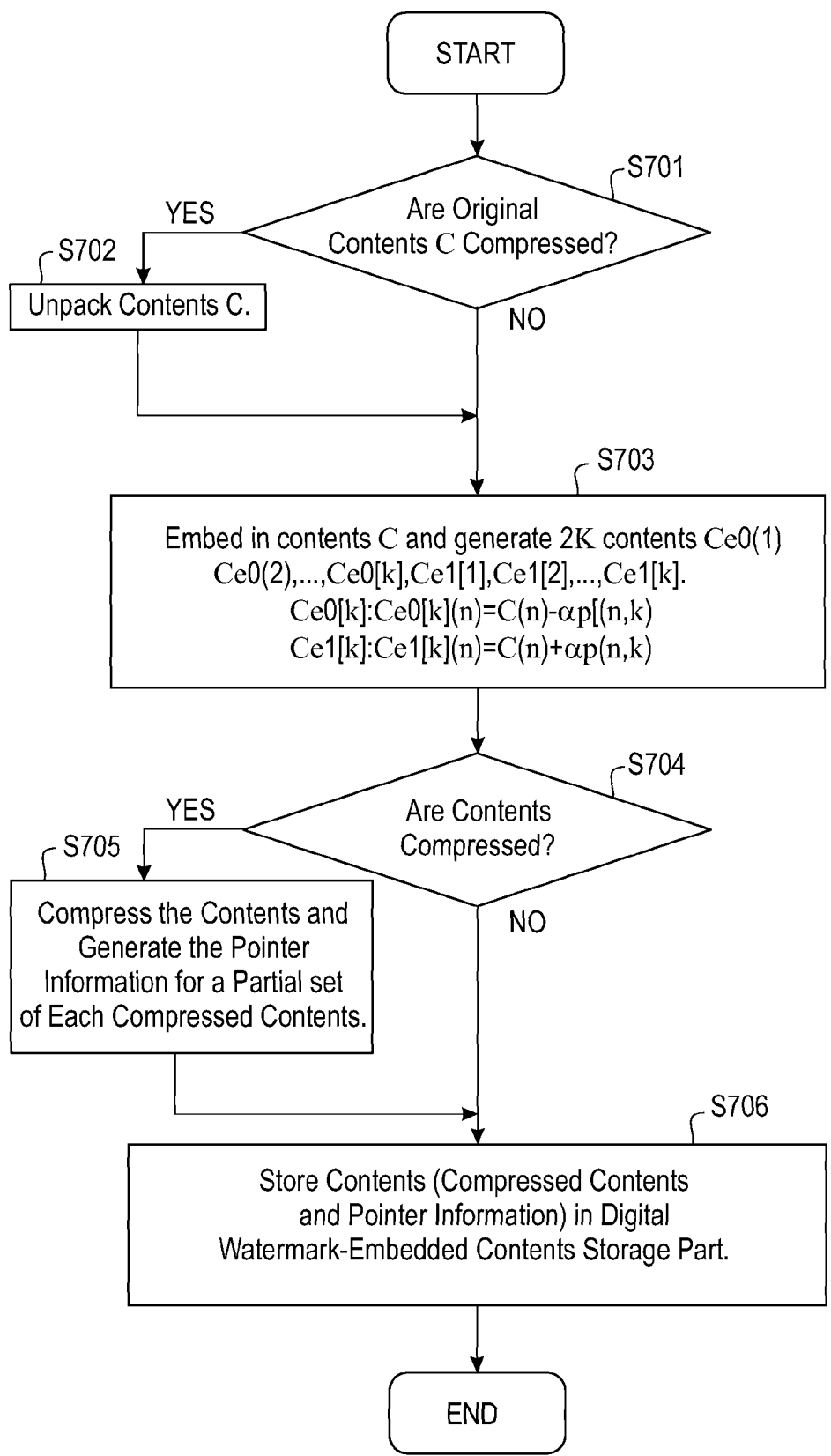
FIG. 7 is a flowchart for explaining a process for generating the digital watermark-embedded contents in a digital watermark-embedding part according to the first embodiment of the invention.
Figure 8:
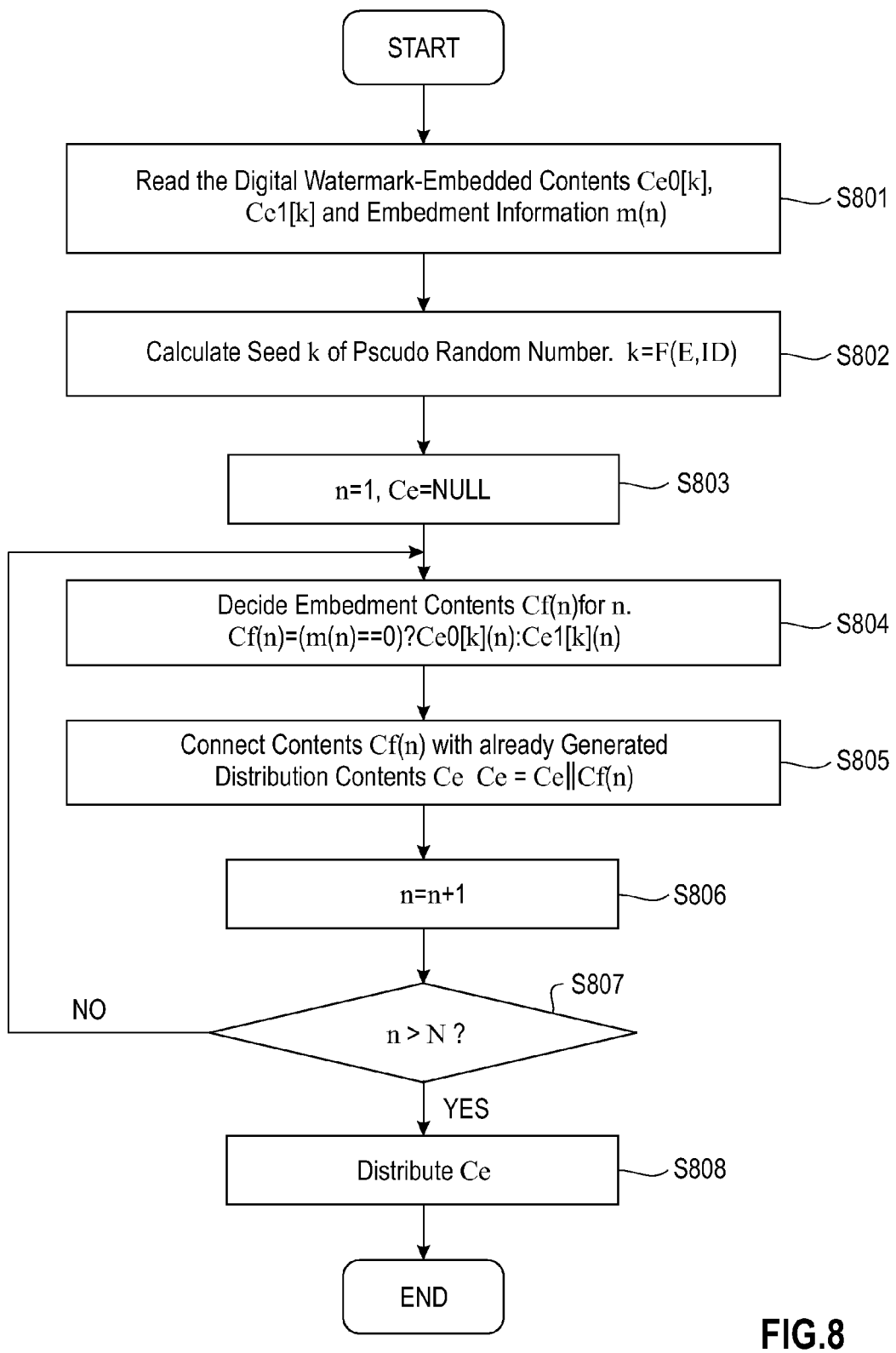
FIG. 8 is a flowchart for explaining a process for generating the fingerprint information in a fingerprint performing part according to the first embodiment of the invention.

FIG. 7 is a flowchart for explaining a process for generating the digital watermark-embedded contents in the digital watermark-embedding part 12, and FIG. 8 is a flowchart for explaining a process for generating the fingerprint information in the fingerprint performing part 14. Since the method for generating the fingerprint information as shown in FIG. 4 is considered a special case (k=1) of the method as shown in FIG. 5, a process for generating the digital watermark-embedded contents Ce0k and Ce1k in K ways (total number of k) will be described.

As shown in FIG. 7, the digital watermark-embedding part 12 reads out the original contents C to embed a digital watermark from the original contents storage part 11. Then, it is checked whether or not the original contents C are compressed, and if compressed, the original contents are unpacked (steps 701, 702).

Then, the digital watermark is embedded in the original contents C to generate the 2K digital watermark-embedded contents Ce0[1], Ce0[2], . . . , Ce0[K], Ce1[1], Ce1[2], . . . , Ce1[K] (step 703).

Lastly, the digital watermark-embedding part 12 stores the generated digital watermark-embedded contents Ce0[1], Ce0[2], . . . , Ce0[K], Ce1[1], Ce1[2], . . . , Ce1[K] in the digital watermark-embedded contents storage part 13 (steps 704, 706). When the digital watermark-embedded contents Ce0[1], Ce0[2], . . . , Ce0[K], Ce1[1], Ce1[2], . . . , Ce1[K] are compressed and stored, each contents are compressed, and the pointer information pointing to a delimiter position of a partial set for each compressed contents is generated (steps 704, 705), and then is stored together with the compressed contents in the digital watermark-embedded contents storage part 13 (step 706). The details of the pointer information will be described later.

The fingerprint performing part 14 makes a fingerprint on the contents involving an acquisition request, when the contents server 10 accepts the acquisition request for the contents from a certain client terminal 20.

As shown in FIG. 8, the fingerprint performing part 14 first of all reads out the digital watermark-embedded contents Ce0[1], Ce0[2], . . . , Ce0[K], Ce1[1], Ce1[2], . . . , Ce1[K] (hereinafter abbreviated as digital watermark-embedded contents Ce0[k], Ce1[k]) for use to generate the fingerprint information from the digital watermark-embedded contents storage part 13. Also, the embedment information m(n) is read from the predetermined storage device (step 801). And the pseudo random number generator 142 calculates the seed k of pseudo random number based on the access information (user ID) contained in the acquisition request and a predetermined embedment key E (step 802). Namely, $k=F(E,ID)$ ($F$ is a function of calculating the seed)

Then, the pseudo random number generator 142 sets parameter n and the distribution contents Ce such as n=1 and Ce=NULL (step 803), and decides a partial set Cf(n) of the contents with fingerprint for the parameter n, based on this parameter n, the seed k of the pseudo random number calculated at step 802, and the embedment information m(n) (step 804). Then, the contents selector 141 selects any of the partial sets Ce0[k](n) and Ce1[k](n) for the parameter n in the digital watermark-embedded contents Ce0[k] and Ce1[k]). The partial sets Ce0[k](n) and Ce1[k](n) of the selected contents Ce0[k] and Ce1[k] are temporarily held in the predetermined storage device (main memory 103 in the computer as shown in FIG. 2). When the original contents C is also employed to generate the fingerprint information as with the method as shown in FIG. 6, Cf(n) is selected from any of Ce0[k](n), Ce1[k](n) and C(n).

Thereafter, the fingerprint performing part 14 couples the partial set Cf(n) of the contents for the decided parameter n with the distribution contents Ce already generated and held in the predetermined storage device (step 805).

$Ce=Ce\|Cf(n)$

Since initially, Ce=NULL at step 803, it follows that $Ce=Cf(1)$

The distribution contents Ce generated up to step 805 are temporarily held in the predetermined storage device (main memory 103 in the computer as shown in FIG. 2).

Then, the fingerprint performing part 14 increments the value of parameter n by 1, and if the new value of parameter n is within the total number N of the partial sets C(n) of the original contents C, the operation gets back to step 804 to repeat the processing for the new parameter n (steps 806, 807). If the value of parameter n reaches N, the distribution contents Ce is completed and the operation is ended.

The completed distribution contents Ce are read out from the storage device, and distributed in accordance with a form of the network 30 to which the contents server 10 is connected (e.g., via the network interface 106 as shown in FIG. 2) (step 808). When the distribution contents Ce are distributed in streaming, the partial sets Cf(n) of the contents with fingerprint decided at step 804 are sequentially distributed without waiting for completion of the distribution contents Ce.

As described above, in this embodiment, a plurality of contents where a digital watermark is embedded are prepared, and combined and thereby the fingerprint information is added to the contents. Accordingly, the processing cost is lower, and the contents server 10 has a reduced load, unlike the case where the digital watermark containing the fingerprint information is embedded in the contents. Since the fast processing is made, this embodiment is suitable as a method for dynamically adding the fingerprint information to the contents after accepting an acquisition request for the contents from the client terminal 20.

By the way, in the case where the original contents of distribution object are compressed, the size of the partial set C(n) of the contents to embed the 1 bit information is varied depending on the value of n. Namely, when the contents selector 141 switches the digital watermark-embedded contents Ce0 and the digital watermark-embedded contents Ce1, the switching timing can not be provided for each constant number of bits. To solve this, the codeword sequence offset information (offset information of bit row) according to the compression format is generated to facilitate the switching for each n at the same time when generating the digital watermark-embedded contents Ce0 and Ce1. And this codeword sequence offset information is used as the pointer information pointing to a delimiter position of the partial set of each compressed contents (table registering the codeword sequence offset information associated with the delimiter position). That is, the fingerprint performing part 14 generates the contents Cf by switching the compressed digital watermark embedded contents Ce0 and Ce1 at a position pointed to by the pointer information in the contents selector 141.

In this manner, the compressed contents with fingerprint is generated by embedding arbitrary information in the compressed contents at lower calculation cost without unpacking the compressed contents at all such as decoding the Huffman code or dequantizing by referring to the codeword sequence offset information. The codeword sequence offset information may be compressed and recorded to reduce the capacity of the distribution system.

For example, when the contents are compressed in MPEG2/4 AAC, the codeword sequence offset may be the number of bits for each raw data block or section. To reduce the size of the codeword offset information, a difference in the number of bits between adjacent raw data blocks or sections may be recorded.

Figure 9:
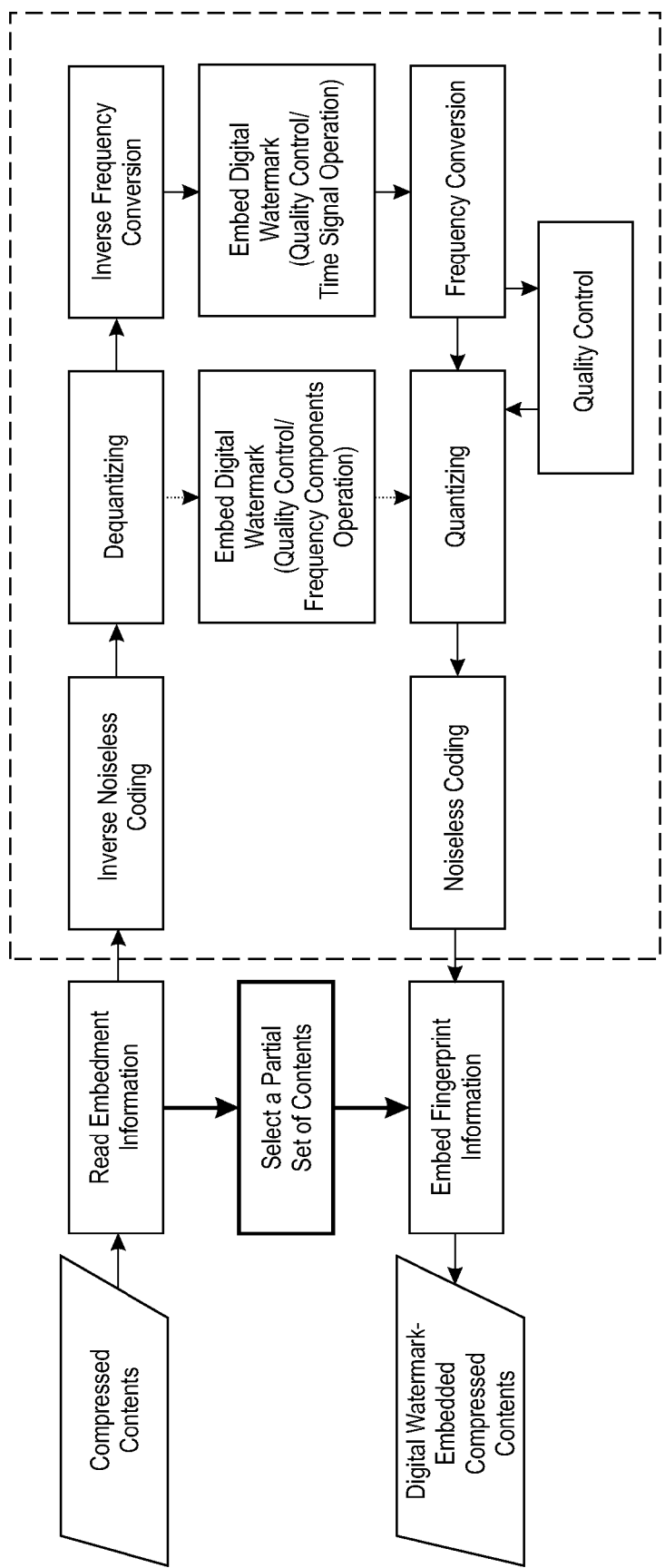
FIG. 9 is a block diagram showing a process for making fingerprint with digital watermark in the compressed contents according to the first embodiment of the invention, as compared with the conventional process.

FIG. 9 is a block diagram showing a process for making fingerprint with digital watermark in the compressed contents according to this embodiment, as compared with the conventional process.

As shown in FIG. 9, through the conventional process, to embed the digital watermark in the contents, the compressed contents are once unpacked (with dequantizing or inverse frequency conversion), the digital watermark is embedded, and then recompressed (with frequency conversion or quantizing) to generate a bit row describing the embedment information. On the contrary, in this embodiment, a bit row corresponding to the embedment information is generated by selectively switching the partial set of contents based on the embedment information (route indicated by the heavy line in FIG. 9). Therefore, in this embodiment, an operation surrounded by the broken line in FIG. 9 is omitted, as compared with the conventional method. Accordingly, the processing cost for making the fingerprint on the contents is reduced, and the contents server 10 has a greatly reduced load.

A process for generating the contents with fingerprint in this embodiment will be specifically described below, taking a process for embedding the distribution destination information in distributing the multi-media contents as an instance.

In the on-line distribution of the image contents or audio contents, when there is a download request for the same contents from different users at the same time, a case is considered in which a digital watermark containing the different distribution destination information (user information) is embedded as the fingerprint in response to each request. The image contents or audio contents are usually compressed and distributed. However, employing this embodiment as above described, the distribution destination information as the fingerprint information can be added at lower calculation cost without unpacking the compressed contents. Particularly, this embodiment is effective for a streaming type contents distribution in which the real time processing is required. Also, the temporally changing information (e.g., time stamp) as the fingerprint information is dynamically embedded at lower processing cost.

Specifically, the fingerprint information is added in distributing the contents compressed in MPEG-2/4 AAC in the following way.

(1) Embedding 1 Bit Information Per Frame

When embedding 1 bit information alone for one frame, the digital watermark-embedding part 12 generates in advance a plurality of compressed contents where single bit information is embedded and the codeword sequence offset information describing the bit position for each raw data block, without regarding how the frequency components are dealt with, which are stored in the digital watermark-embedded contents storage part 13. The adjacent raw data blocks overlap by 50% along the time axis. Accordingly, if the compressed contents are selectively switched in a unit of raw data block when the fingerprint performing part 14 generates the fingerprint information, switching of each stream is smoothly made without causing the noise. To correctly regenerate the contents generated by switching a plurality of streams, it is necessary that for each prepared compressed contents, the sampling frequency, channel number, and sound source start time are the same.

Figure 10:
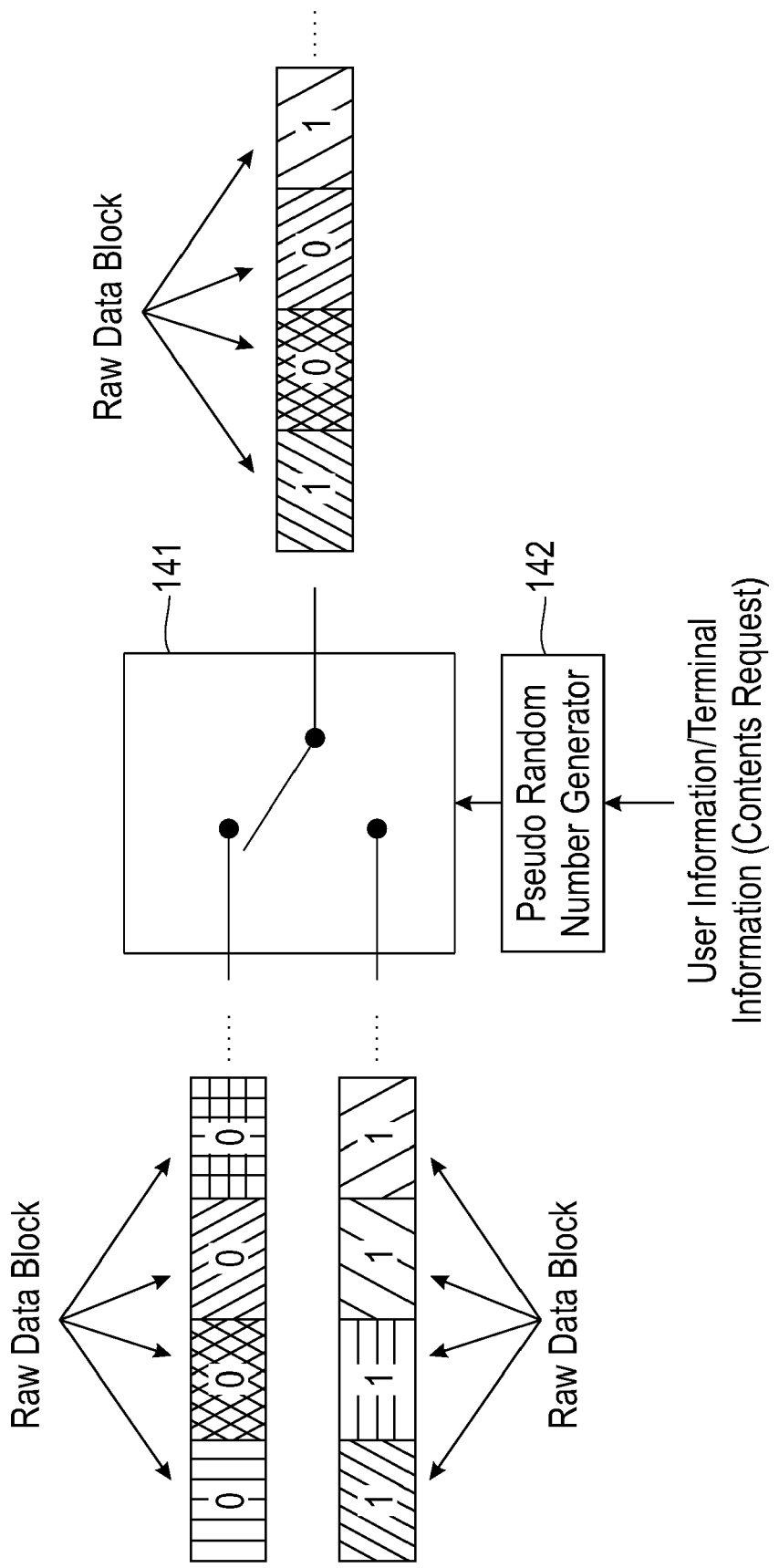
FIG. 10 is diagram showing how to generate the fingerprint information by switching a plurality of contents compressed and with digital watermark-embedded for each raw data block.

FIG. 10 is diagram showing how to generate a bit row (1001) representing the fingerprint information (embedment information) by switching the contents where a digital watermark corresponding to the value 0 of bit information is embedded and the contents where a digital watermark corresponding to the value 1 of bit information is embedded for each raw data block, in which the contents are compressed in MPEG-2/4 AAC.

(2) Embedding Plural Pieces of Bit Information Per Frame

When embedding plural pieces of bit information assigned for one frame, it is necessary to change a method for processing the frequency data within the raw data block. That is, the fingerprint performing part 14 has to switch the prepared contents within the raw data block. To perform this processing fast without solving the Huffman coding, it is required that the section information (section, sect_cb, scale factor) of the plurality of prepared contents is the same. If the section information is the same, spectral data in the individual channel can be switched for each Huffman codeword (every two or four frequency lines).

The digital watermark-embedding part 12 generates beforehand a plurality of compressed contents where bit information is embedded and the codeword sequence offset information describing the bit position for each raw data block under the above conditions, which are stored in the digital watermark-embedded contents storage part 13. Since the prepared contents have the same time position and dynamic range, there is a high possibility that the section information is coincident. However, to correctly make the section information of the contents coincident, it is required to assure that an encoder for the digital watermark-embedding part 12 performs a process for embedding the digital watermark at the time of compressing the contents, and at the same time outputs a plurality of compressed contents.

In the first embodiment described above, the client terminal 20 transmits an acquisition request for the contents to the contents server 10, and in response to this request, the contents server 10 transmits the contents with fingerprint to the client terminal 20. On the contrary, in the second embodiment, embedding a unique ID in the broadcast (including the multi-cast, and so forth) contents is implemented with fingerprint using the digital watermark.

Figure 11:
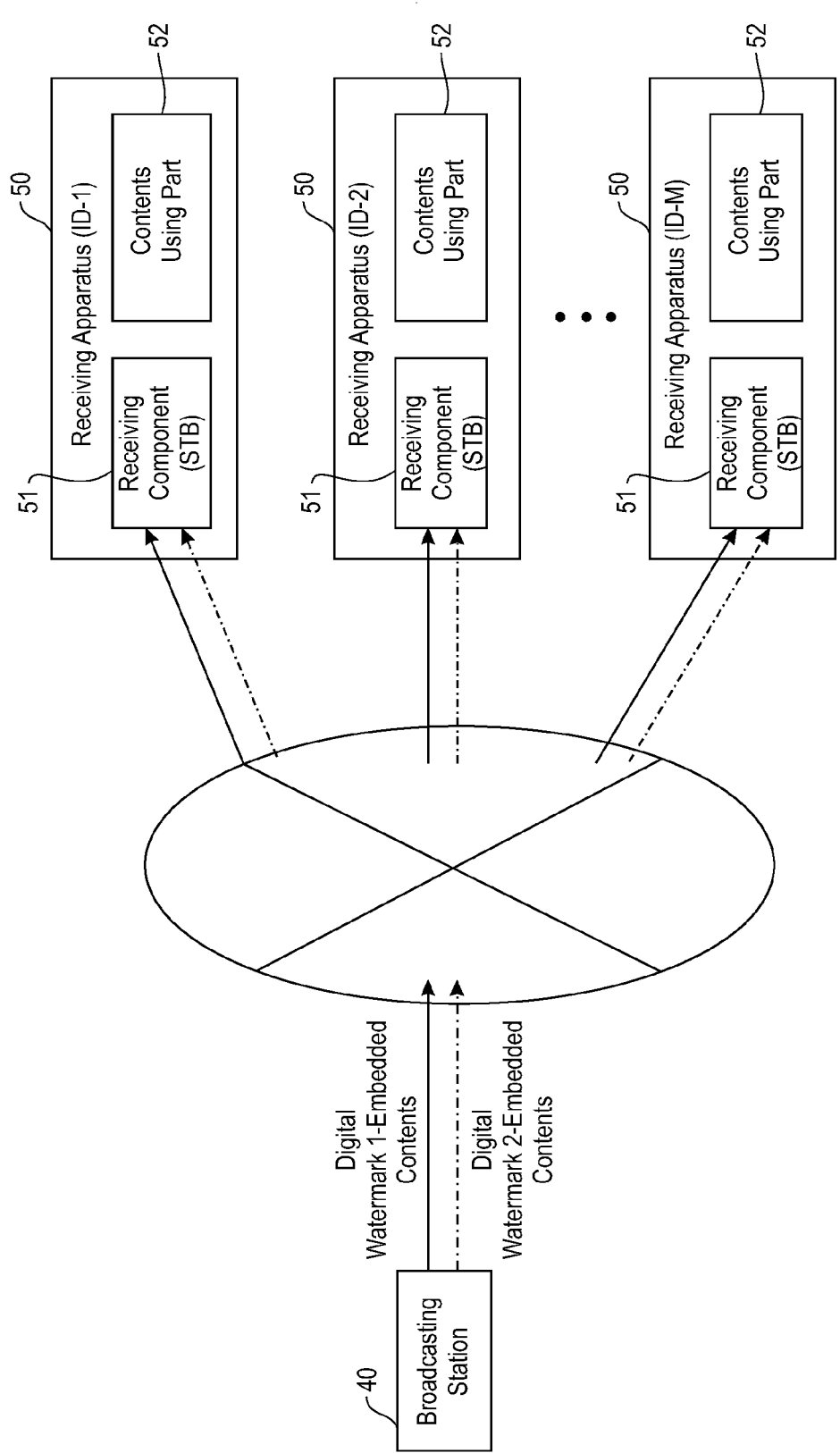
FIG. 11 is a diagram schematically showing the overall configuration of a system for distributing the digital contents according to a second embodiment of the invention.

FIG. 11 is a diagram schematically showing the overall configuration of a system for distributing the digital contents according to a second embodiment of the invention.

As shown in FIG. 11, the system of this embodiment comprises a broadcasting station 40 as the contents server that distributes the contents by broadcasting, and a receiving apparatus 50 as the client terminal that receives the contents distributed from the broadcasting station 40.

In the broadcast for forwarding the contents to a number of users at the same time, it is impossible to add different information (tracking code) for each distribution destination to the distributed contents. Thus, in the second embodiment, when distributing the contents, the contents having two or more different kinds of digital watermarks (digital watermarks 1, 2) inserted are transmitted at the same time, whereby the receiving apparatus 50 stores a plurality of received contents by switching the digital contents in accordance with a predetermined time sequence intrinsic to each receiving apparatus 50. That is, in the receiving apparatus 50, the contents with fingerprint are generated. Thereby, the fingerprint information different for each distribution destination can be embedded in the broadcast contents.

As described above, the broadcasting station 40 forwards the contents having two or more different kinds of digital watermarks (corresponding to bit information 0 and 1) inserted at the same time. However, these contents may be generated from the original contents using a digital watermark-embedding function implemented in the broadcasting station 40, which function is the same as for the digital watermark-embedding part 12 in the contents server 10 of the first embodiment as shown in FIG. 3, or transmitted from the outside by preparing the digital watermark-embedded contents generated from the predetermined original contents. As described in the first embodiment with reference to FIG. 6, the contents not containing the digital watermark corresponding to bit information may be mixed. The means for broadcasting the contents may widely include the electric wave broadcasting such television broadcasting, wire broadcasting and information communication network.

The receiving apparatus 50 comprises a receiving component 51 for receiving the distributed contents, and a contents using part 52 for using (regenerating, perusing) the received contents, as shown in FIG. 11.

The receiving component 51 is realized by a set top box (STB) dedicated for the television receiver, for example, and has a function of receiving the general contents, and a function of processing the received contents to be usable in the contents using part 52, as well as in this second embodiment, the same function of the fingerprint performing part 14 in the contents server 10 of the first embodiment as shown in FIG. 3. That is, a plurality of contents of the same contents where a digital watermark corresponding to the bit information 0 or 1 is embedded are switched and synthesized for each specific part. Thereby, the contents having embedded the fingerprint information described in a bit row being formed by the digital watermark are generated.

In this embodiment, an intrinsic apparatus ID (ID-1, ID-2, ..., ID-M in the illustrated example) is attached to each receiving apparatus 50, and held in a predetermined storage device such as a semiconductor memory. The receiving component 51 selectively switches a partial set of the contents where a digital watermark corresponding to the value 0 of bit information is embedded and a partial set of the contents where a digital watermark corresponding to the value 1 of bit information is embedded in accordance with a time sequence intrinsic to each receiving apparatus 50 that is decided on the basis of this apparatus ID, and generates the fingerprint information intrinsic to each receiving apparatus 50.

For example, assuming that the M distribution contents at time t are $I_i(t)$ (i=1, ..., M), and the embedment information dependent on the apparatus ID is $O_{ID}(t)$, $O_{ID}(t)=I_{f(t,ID)}(t)$ where f(t,ID) is a function of outputting an integer from 1 to n in accordance with the time t. For any ID pair X, Y ($X^1$ Y), there is a certain period $t_0 \leq t \leq t_1$ for which $f(t,X)^1 f(t,Y)$ is satisfied.

A specific operation for adding the embedment information as the fingerprint information to the contents is the same as the process performed by the fingerprint performing part 14 in the first embodiment and described with reference to FIG. 8. In this embodiment, the pseudo random number generator 142 calculates the seed of the pseudo random number function in accordance with a time sequence based on the apparatus ID, and the contents selector 141 is controlled in accordance with a pseudo random number sequence calculated from this seed.

In the above manner, a sequence (secondary information) unique for each distribution destination and varying with the elapse of time can be embedded in the contents. The information designating the distribution destination alone may be embedded irrespective of the elapse of time, depending on the use mode or purpose of the fingerprint information embedded in the contents. Conversely, the information designating the distribution time alone may be embedded irrespective of the distribution destination. Furthermore, other parameters than the distribution destination and the distribution time may be set and embedded as the fingerprint information in the contents.

The contents using part 52 is realized by a television receiver, for example, to regenerate the contents with fingerprint received by the receiving component 51.

The receiving apparatus 50 comprises a storage means (not shown) such as a magnetic disk unit that can store the contents via the receiving components 51.

The distribution destination and the distribution time of the contents are designated by the fingerprint information embedded in the contents in this embodiment. Accordingly, when the period or time zone where the specific contents are frequently distributed is investigated or the secondary distribution of the predetermined contents is made, it is possible to determine whether or not the distribution is made without legal right by investigating the source or the primary distribution mode.

In this embodiment, a plurality of contents where a digital watermark is embedded are distributed at the same time, and synthesized by the receiving apparatus 50 to add the apparatus-intrinsic information to the contents. A method for describing the information by combining a plurality of contents where a digital watermark is embedded, rather than adding the information by embedding the digital watermark in the contents has a lower processing cost and a high speed, and is suitable for adding the information in the contents received by the receiving apparatus 50. Accordingly, the information intrinsic to the distribution destination can be added to the contents in the broadcast or multi-cast with no designation of the distribution destination.

As described above, with this invention, it is possible to embed a different digital watermark in the digital contents for each access without increasing load at the contents server to the utmost.

Also, it is possible to implement a digital contents distribution system practically on line using such a digital watermark-embedding technique.

While the invention has been described with respect to certain preferred embodiments and exemplifications, it is not intended to limit the scope of the invention thereby, but solely by the claims appended hereto.

We claim:

1. A contents server distributing digital contents via a network in response to an acquisition request from outside, said contents server comprising:
    a contents storage part for storing a plurality of first digital contents wherein a different first digital watermark is embedded;
    a storage device containing first embedment information; and
    a first digital contents information adding part comprising:
        a content selector for:
            inputting a first digital watermark embedded digital contents Ce0 and a second digital watermark embedded digital contents Ce1, wherein Ce0 and Ce1 are unique to one of a plurality of acquisition requestors requesting second digital content, and wherein Ce0 and Ce1 are calculated responsive to intensity of the first digital watermark, and
            selectively switching and outputting the plurality of first digital contents; wherein Ce0 and Ce1 are calculated responsive to intensity of said first digital watermark, and
        a pseudo random number generator for:
            controlling said content selector to output a predetermined number of partial sets Ce0(n) of Ce0 and a predetermined number of partial sets Ce1(n) of Ce1 and a predetermined number of partial sets C(n) of C;
            generating an embedded second digital watermark content Cf;
        wherein the predetermined number of partial sets Ce0(n), Ce1(n),and C(n) are greater than one; and wherein the partial set Ce0(n)=C(n)−ap(n) and the partial set Ce0(1)=C(n)+ap(n), where a is a parameter representing the intensity of the embedded second digital watermark, and storing said partial sets Ce0(n), Ce1(n) and C(n) to a predetermined storage device; and
            synthesizing said first digital contents for the one of the plurality of acquisition requesters,
            adding to the first digital contents information specified by the first digital watermark that is different for each of the plurality of acquisition requesters, said first digital contents information responsive to the first embedment information;
        wherein the first embedment information is responsive to time of distribution of the first digital contents.

2. The contents server according to claim 1, wherein said information adding part dynamically adds said first digital contents information to said plurality of first digital contents in response to one of the plurality of acquisition requesters for predetermined third digital contents.

3. The contents server according to claim 1, wherein said information adding part forms a bit row with the first digital watermark embedded for each part of said plurality of first digital contents and describes said plurality of first digital contents information in said plurality of first digital contents with said bit row.

4. The contents server according to claim 1, wherein said contents storage part stores said plurality of first digital contents compressed in a predetermined compression format, and said information adding part for, by synthesizing a plurality of said first digital contents based on codeword sequence offset information regarding said plurality of first digital contents in accordance with said predetermined compression format, adding said information without unpacking said plurality of first digital contents.

5. A computer comprising:
    a central processing unit;
    a main memory;
    a first selector for inputting a plurality of first digital contents wherein a different first digital watermark is embedded, and for outputting while switching selectively said plurality of first digital contents for each specific part;
    an information adding part comprising:
        a second selector for inputting a first digital watermark embedded digital contents Ce0 and a second digital watermark embedded digital contents Ce1, and selectively switching and outputting Ce0 and Ce1, digital contents, and
        a pseudo random number generator for controlling said content selector to output a first partial set Ce0(n) of Ce0 and a second partial set Ce1(n) of Ce1 to generate the second digital watermark embedded digital content Cf, for synthesizing said plurality of first digital contents for one of a plurality of acquisition requesters, adding to said first digital contents information specified by a second digital watermark that is different for each of a plurality of acquisition requesters being embedded for a part of said first digital contents;
    a fingerprinting information generating part generating a first predetermined number of third partial sets of Ce0 and a second predetermined number of fourth partial sets of Ce1; said third and fourth partial sets varied for each of the plurality of the acquisition requesters; wherein the first and second predetermined numbers are greater than one; and
    a control part for controlling said first selector based on a predetermined embedment information, said computer generating by a control at said control part, wherein said predetermined embedment information is described with a bit row being formed by said second digital watermark embedded in each of said part of said digital contents.

6. The computer according to claim 5, wherein said first selector inputs the plurality of first digital contents where a third digital watermark representing a bit information 0 is embedded, and a plurality of the first digital contents where a fourth digital watermark representing a bit information 1 is embedded, and selects second digital contents where a fifth digital watermark corresponding to desired bit information is embedded under a control of said control part.

7. The computer according to claim 5, wherein said first selector inputs to said plurality of first digital contents where a third digital watermark representing the bit information 0 is embedded, said plurality of first digital contents where a fourth digital watermark representing the bit information 1 is embedded, and said plurality of first digital contents where a fifth digital watermark is not embedded, and selects said plurality of first digital contents under a control of said control part whereby a portion containing no bit information is set in said bit row describing said predetermined embedment information.

8. The computer according to claim 5, wherein said first selector selectively switches said plurality of first digital contents, based on pointer information pointing to a delimiter for said part of said plurality of first digital contents.

9. The computer according to claim 8, wherein said first selector inputs said plurality of first digital contents compressed in a predetermined compression format, and selectively switches said plurality of first digital contents, using a codeword sequence offset information regarding said plurality of first digital contents in accordance with said predetermined compression format as said pointer information.

10. A computer program product comprising a computer readable storage medium having computer readable code stored thereon for causing a computer to perform the data processing by controlling a computer, comprising:

computer readable program code configured to read out predetermined embedment information from a predetermined storage device; and computer readable program code configured to acquire a plurality of first digital contents where a different first digital watermark is embedded, selectively switching said plurality of first digital contents for a specific part, based on said predetermined embedment information, and generating the plurality of first digital contents describing said predetermined embedment information, using a bit sequence formed with a second digital watermark embedded in said part of said plurality of first digital contents said process comprising adding information by a method comprising an information adding step comprising:

selecting content for inputting first digital watermark embedded digital contents Ce0 and second digital watermark embedded digital contents Ce1, wherein Ce0 and Ce1 are unique to a specific acquisition requestor requesting digital content, and wherein Ce0 and Ce1 are calculated responsive to intensity of the first digital watermark, and selectively switching and outputting the digital contents, and generating a pseudo random number for selecting content to output a first predetermined number of partial sets Ce0(n) of Ce0 and a second predetermined number of partial sets Ce1(n) of Ce1 and a third predetermined number of partial sets C(n) of C to generate digital watermark content Cf; wherein the first, second, and third predetermined numbers of partial sets are greater than one: and wherein the partial set Ce0(n)=C(n)−ap(n) and the partial set Ce0(1)=C(n)+ap(n), where a is a parameter representing the intensity of the embedded third digital watermark storing said partial sets Ce0(n), Ce1 (n) and C(n) to a predetermined storage device:

synthesizing said plurality of first digital contents for one of a plurality of acquisition requesters, and adding to said plurality of first digital contents predetermined embedment information specified by a second digital watermark that is different for each of a plurality of acquisition requesters being embedded for each part of said plurality of first digital contents; and computer readable program code configured to generate sequence offset information describing bit positions for raw data blocks of said plurality of first digital contents; said sequence offset information used in selecting said plurality of first digital contents to output said partial set Ce0(n) of Ce0 and the partial sets Ce1(n) of Ce1 to generate first digital watermark content Cf.

11. The program product according to claim 10, wherein said computer acquires a second plurality of digital contents where a third digital watermark representing the bit information 0 is embedded, and a third plurality of digital contents where a fourth digital watermark representing the bit information 1 is embedded, and selecting a fourth plurality of digital contents where a fifth digital watermark corresponding to appropriate bit information describing said predetermined embedment information is embedded.

12. The program product according to claim 10, wherein said computer acquires a second plurality of digital contents where a sixth digital watermark representing the bit information 0 is embedded, a third plurality of digital contents where a seventh digital watermark representing the bit information 1 is embedded, and a fourth plurality of digital contents where an eighth digital watermark is not embedded, and generating a fifth plurality of digital contents describing said predetermined embedment information, using said bit sequence with said second digital watermark where a portion containing no bit information is set.

13. The program product according to claim 10, wherein said computer acquires said plurality of first digital contents compressed in a predetermined compression format, and selects said plurality of first digital contents, based on a codeword sequence offset information regarding said plurality of first digital contents in accordance with said predetermined compression format.

* * * * *